June 17, 1969    F. W. BARRY    3,450,142
MACH NUMBER INTERNAL CONTRACTION CONTROL
Filed Feb. 23, 1967
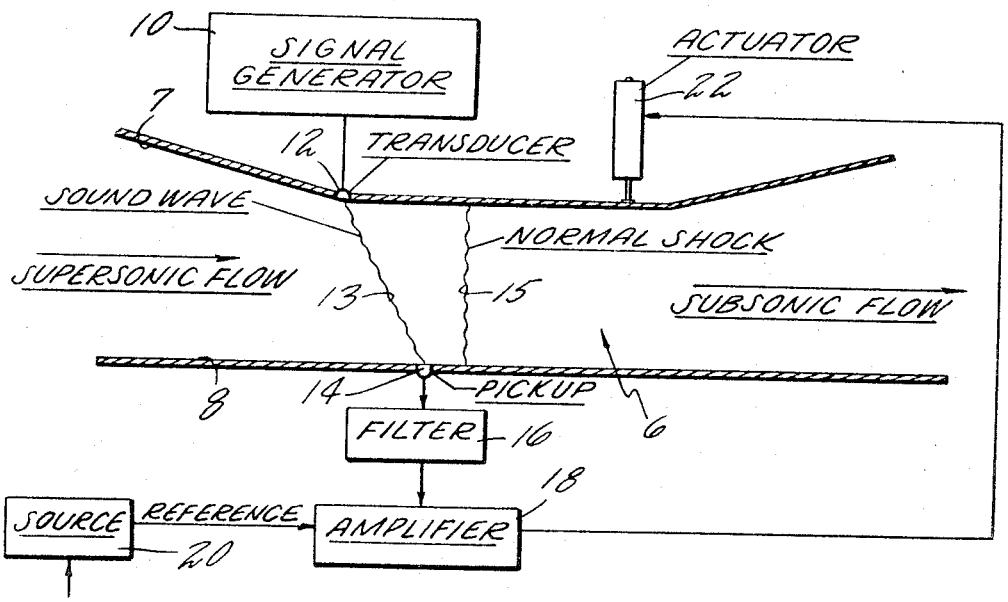
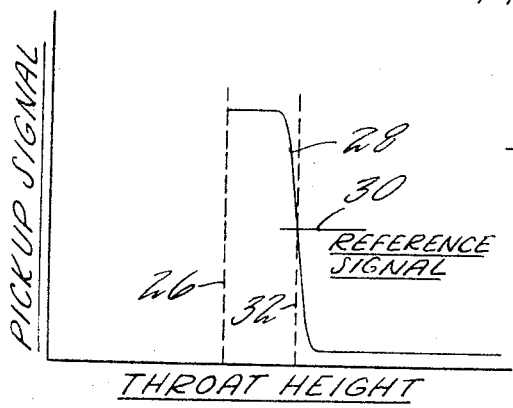
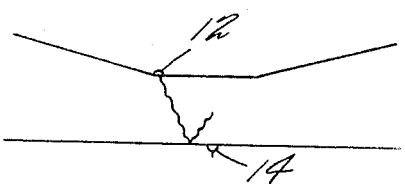
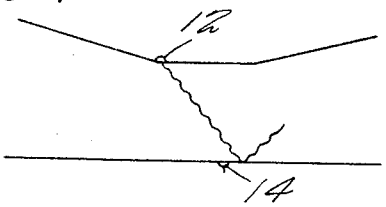
INVENTOR
FRANK W. BARRY
BY Melvin Pearson Williams
ATTORNEY

United States Patent Office

3,450,142
Patented June 17, 1969

3,450,142
MACH NUMBER INTERNAL CONTRACTION CONTROL
Frank W. Barry, Windsor, Conn., assignor to United Aircraft Corporation, East Hartford, Conn., a corporation of Delaware
Filed Feb. 23, 1967, Ser. No. 617,932
Int. Cl. F02b *27/02;* F02k *7/10*
U.S. Cl. 137—15.2                               2 Claims

ABSTRACT OF THE DISCLOSURE

A transducer on one wall of an internal contraction of an inlet in an air-induction system sends a sonic signal to a transducer on an opposite wall. The magnitude of the received signal is compared with a reference potential in an amplifier, the difference output of which operates an electromechanical actuator to appropriately alter the size of the throat of the inlet, thereby regulating the Mach number of flow in the inlet.

FIELD OF THE INVENTION

This invention relates to air-induction systems of the type which may be used on aircraft, and more particularly to a control for an internal contraction of an inlet thereof, said control being responsive to the Mach number of the flow in the induction system.

DESCRIPTION OF THE PRIOR ART

In the prior art, the comon practice of achieving desired flow in the throat of an air-induction system has been to design the inlet geometry to achieve approximately the flow desired. However, this requires very careful control over the design and manufacture thereof, and is not necessarily accurate under all conditions. Some attempts have been made to utilize suitable pneumatic signals for controlling inlet geometry, but these have failed in most cases, due in part to the attempted use of point or step responsive systems.

SUMMARY OF THE INVENTION

According to the present invention, the average Mach number of the flow in a throat to be controlled is utilized to control the size of the throat. The basic principle of the present invention is sensing the Mach angle of the flow, and using the indicum derived therefrom to control an actuator which is disposed for increasing and decreasing the size of the throat. The invention utilizes a transducer on one wall of the throat which sends a sonic signal to a pickup (or receiving transducer) on an opposite wall of the throat. Due to the sonic effects of the flow being controlled, the signal received at the pickup will have an amplitude which is directly dependent upon the Mach number of the flow. As an example of the utilization of the device, a contracting passage leading to a throat reduces a high velocity supersonic flow to a flow in the throat at a Mach number close to, but higher than ONE, and therefore within the throat the flow will have a Mach angle which permits receipt at the pickup of the sound transmitted thereto from the transducer, when the flow is at the proper Mach number. When the Mach number of the flow in the throat is too high, the pickup will not be able to sense the sound waves; for Mach numbers very close to ONE, the amplitude of the signal varies quite significantly for small changes in the flow Mach number.

In accordance with particular aspects of one embodiment of the invention, the signal received at the pickup is passed through a filter and fed to an amplifier where the amplitude of the signal is compared against the amplitude of a reference signal, said reference signal being chosen to represent an optimum throat height for a Mach number exceeding ONE, in the throat. The output of the amplifier is fed to an actuator which is bilaterally responsive thereto, to open or close the throat incremental amounts in response to deviations of the received signal amplitude from that of the reference. In other words, if the received signal has a higher amplitude than the reference signal, this means the flow Mach number is too low and, therefore, the actuator will open the throat to increase the speed of flow therethrough. On the other hand, when the received signal has a lower amplitude than the reference signal, this indicates that less of the sound wave is being received at the pickup which means that the flow velocity is too high, so that the negative output of the amplifier causes the actuator to close the throat slightly thereby slowing the flow to the point where the desired Mach number will result.

The invention permits close control over the Mach number of flow in a throat, by means of a complete closed-loop system. The invention is relatively simple and easy to produce, and is readily adapted to a large variety of different environments.

Other objects, features and advantages of the present invention will become more apparent in the light of the following detailed description of a preferred embodiment thereof, as illustrated in the accompanying drawings.

BRIEF DESCRIPTION OF THE DRAWING

In the drawing, FIG. 1 is a simplified semi-illustrative schematic block diagram of an inlet having an internal contraction together with a control system in accordance with one embodiment of the present invention;

FIG. 2 is a plot of pickup signal amplitude relative to throat height;

FIG. 3 is a pictorial illustration of sound transmission directivity for Mach numbers lower than the reference value; and FIG. 4 is a pictorial illustration of the directivity of sound for Mach numbers in excess of the reference value.

DESCRIPTION OF THE PREFERRED EMBODIMENT

Referring now to FIG. 1, an air-induction system in which the present invention may be incorporated comprises a throat 6 which is made up of first and second opposing walls 7, 8 together with walls (not shown) which connect them so as to form a passage. A signal generator 10 supplies an appropriate sound-inducing signal to a transducer 12, the transducer 12 being directional in characteristic and oriented so as to direct the sound 13 emanating therefrom toward a pickup (or receiving transducer) 14. The transducers 12, 14 are located upstream from the normal shock 15 which results from the transition from supersonic flow to subsonic flow within the throat.

The output of the receiving transducer (or pickup) 14 is fed to a filter 16, which in turn feeds an amplifier 18. The amplifier 18 is fed a reference signal from a controllable source 20, the amplifier 18 being responsive to the difference between the signals applied thereto from the filter 16 and the source 20. The output of the amplifier therefore represents the variation of the received signal from the desired signal level. This output is applied to a voltage responsive actuator 22 which may comprise an electromagnetic solenoid or other suitable device, such as a motor, which is capable of moving some portion of the throat wall in response to the voltage received thereby.

The relationship of the reference signal, which transmits the signal received by the pickup, and the height or cross section of the throat is illustrated in FIG. 2. For throat heights exceeding a certain minimum (as depicted by reference numeral 26) the pickup signal which is received will vary with the throat height as indicated by the graph line 28. The substantially vertical portion of the graph line 28 is the controlled portion of throat height as a function of pickup signal. A reference signal depicted at 30 is chosen to be within the controlled response area, so that for variations in pickup signal from the reference signal, corrective adjustment of the throat height will be made by the actuator 22 so as to restore the throat height to that value (depicted by reference numeral 32) at which the pickup signal equals the reference signal, which is chosen to be at a throat height which gives a suitable Mach number exceeding one within the throat area. Whenever the throat height is too low, giving too small a throat area, the flow velocity is too low and sound may be directed toward the pickup so readily as to give a higher amplitude than that which is required, as illustrated in FIG. 3. On the other hand, whenever the throat height is so large that the throat Mach number exceeds the desired value, the sound does not reach the pickup, as illustrated in FIG. 4, so that the pickup signal is markedly reduced. The illutrations of FIG. 3 and FIG. 4 are exaggerated for illustrative purposes, but it should be appreciated by those skilled in the art that minor variations in the directivity of the sound from the transmitting transducer 12 to the receiving transducer or pickup 14 as a result of variations in the Mach number will cause a corresponding response out of the amplifier 18 so that the actuator 22 will take corrective action on the size of the throat thereby to insure the maintenance of flow having a suitable Mach number exceeding one within the throat 6.

The invention is simply illustrated herein with reference to an orthogonal throat or inlet, but is equally useful in any sort of axially-symmetrical inlet. In an axially-symmetrical inlet, several signal generators and pickups may be distributed about the circumference or periphery of the flow, and the throat area may then be decreased only in the case where all signals exceed in amplitude the amplitude of the reference signal, or other combinations may be employed to suit the design requirements of any particular utilization of the present invention.

The significant aspect of the present invention is the employment of acoustical means for sensing an average throat Mach number rather than being point responsive. This makes possible closed-loop control over inlet geometry with a signal responding to average conditions so as to give practical, definitive control over the flow in the contracting throat of an inlet.

Although the invention has been shown and described with respect to preferred embodiments thereof, it should be understood by those skilled in the art that various changes and omissions in the form and detail thereof may be made therein without departing from the spirit and scope of the invention which is to be limited and defined only as set forth in the following claims.

Having thus described a preferred embodiment of my invention, what I claim as new and desire to secure by Letters Patent of the United States is:

1. A system for use in controlling supersonic flow through a throat comprising:
   a directional sonic signal transmitter disposed on one side of said throat upstream of the position of the normal shock therein;
   a sonic signal receiver disposed on an opposing side of said throat upstream of the position of the normal shock therein, said receiver being disposed with respect to said transmitter at the Mach angle relating to the desired flow;
   control means responsive to the amplitude of signal received at said sonic receiver for supplying a control signal;
   and means responsive to said control signal for varying the cross-sectional area of said throat so as to control the supersonic flow through said throat.

2. The control systems according to claim 1 wherein said control means further comprises:
   means producing a reference signal indicative of said Mach angle; and
   means comparing said reference signal and said received signal to produce, as a function of the difference therebetween, said control signal.

References Cited

UNITED STATES PATENTS

| | | | |
|---|---|---|---|
| 2,971,330 | 2/1961 | Clark | 137—15.2 |
| 2,826,912 | 3/1958 | Kritz. | |
| 2,911,787 | 11/1959 | Barry | 138—45 |
| 2,920,446 | 1/1960 | Ranard. | |
| 2,971,329 | 2/1961 | Barry | 73—181 XR |
| 3,039,305 | 6/1962 | Hall | 73—182 XR |

ROBERT R. MACKEY, *Primary Examiner.*

U.S. Cl. X.R.

138—45